(12) United States Patent
Paul

(10) Patent No.: US 8,708,702 B2
(45) Date of Patent: *Apr. 29, 2014

(54) SYSTEMS AND METHODS FOR LEARNING USING CONTEXTUAL FEEDBACK

(75) Inventor: Terrance D. Paul, Boulder, CO (US)

(73) Assignee: LENA Foundation, Boulder, CO (US)

( * ) Notice: Subject to any disclaimer, the term of this patent is extended or adjusted under 35 U.S.C. 154(b) by 2414 days.

This patent is subject to a terminal disclaimer.

(21) Appl. No.: 11/162,520

(22) Filed: Sep. 13, 2005

(65) Prior Publication Data

US 2007/0172805 A1    Jul. 26, 2007

Related U.S. Application Data

(60) Provisional application No. 60/522,340, filed on Sep. 16, 2004.

(51) Int. Cl.
    *G09B 19/06* (2006.01)

(52) U.S. Cl.
    USPC ............................ 434/156; 434/157; 434/178

(58) Field of Classification Search
    USPC ................................................ 434/156, 178
    See application file for complete search history.

(56) References Cited

U.S. PATENT DOCUMENTS

| | | | |
|---|---|---|---|
| 4,464,119 A * | 8/1984 | Vildgrube et al. ............ | 434/185 |
| 5,679,001 A * | 10/1997 | Russell et al. ................ | 434/185 |
| 5,873,728 A | 2/1999 | Jeong | |
| 6,071,123 A * | 6/2000 | Tallal et al. ................... | 434/116 |
| 6,123,548 A | 9/2000 | Tallal et al. | |
| 6,157,913 A | 12/2000 | Bernstein | |
| 6,212,502 B1 | 4/2001 | Ball et al. | |
| 6,336,089 B1 | 1/2002 | Everding | |
| 6,554,617 B1 | 4/2003 | Dolan | |
| 6,725,198 B2 | 4/2004 | Waryas et al. | |
| 6,732,076 B2 | 5/2004 | Masterson et al. | |
| 6,807,395 B2 * | 10/2004 | Iwazaki et al. ................ | 434/350 |
| 2002/0150869 A1 * | 10/2002 | Shpiro .......................... | 434/156 |
| 2003/0033145 A1 * | 2/2003 | Petrushin ...................... | 704/236 |
| 2003/0144839 A1 | 7/2003 | Dharanipragada et al. | |

OTHER PUBLICATIONS

Fell, Harriet et al. "Automatic Babble Recognition for Early Detection of Speech Related Disorder" Proceedings of The Third International ACM SIGCAPH Conference on Assitive Technologies. Apr. 15-17, 1998.*

Morris, Suzanne. "Pre-Speech Assessment Scale: A Rating Scale for the Measurement of Pre-Speech Behaviors from Birth through Two Years. Revised Edition". A. Preston Corp., 60 Page Rd., Clifton, NJ 07012. 1982.*

* cited by examiner

*Primary Examiner* — Robert J Utama
(74) *Attorney, Agent, or Firm* — Patton Boggs LLP

(57) ABSTRACT

A method of supporting vocabulary and language learning by positioning at least one microphone so as to capture speech in the listening environment of a learner. The microphone is monitored to develop a speech signal. The speech signal is analyzed to determine at least one characteristic of the speech or vocalization, wherein the characteristic indicates a qualitative or quantitative feature of the speech. The determined characteristic is compared to a preselected standard or such characteristic is tracked to show growth over time and the comparison or growth is reported to the person associated with the speech signal or person who potentially can affect the language environment of the learner.

28 Claims, 4 Drawing Sheets

SYSTEMS AND METHODS FOR LEARNING USING CONTEXTUAL FEEDBACK

The present application claims the benefit of U.S. Provisional Patent Application Ser. No. 60/522,340 filed on Sep. 16, 2004 which is incorporated herein by reference.

FIELD OF THE INVENTION

The present invention relates, in general, to education enhancement software and systems, and, more particularly, to software systems and methods to monitor speech to enhance the development of vocabulary and language ability.

RELEVANT BACKGROUND

Language distinguishes humans from all other animals and is strongly related to intelligence. Improving language ability typically results in a higher intelligent quotient (IQ) as well as improved literacy and academic skills. A child's language ability and vocabulary at age three is a strong predictor of both intelligence and test scores in reading and math at age ten and beyond.

Children begin to acquire language at birth. The early years (i.e., birth to age four) are critical for language development. Though humans learn vocabulary and language throughout their lives, these early years establish a trajectory for later language development.

Humans are natural language learners. The ability to learn language is genetically programmed in the human species. Early language ability develops in natural contexts instinctively as an outgrowth of the conversations between a child and his or her parent or primary caregiver. Early language ability develops from many social interactions including when a parent reads a book to a child. Television and computers can also result in language learning, although they are not typically major contributors.

A rich aural or listening language environment in which many words are spoken with a high number of affirmations versus prohibitions produces children who have high language ability and higher than normal IQ. Even after children begin school, and after children begin to read, much of our language ability and vocabulary, the words we know (receptive vocabulary) and the words we use in speech (expressive vocabulary) come incidentally from conversation with people around us. While some vocabulary is often learned formally in school through studying lists of vocabulary words or from computer software programs designed to teach vocabulary and informally through book reading, the foundation of human language ability and vocabulary comes from social interaction, conversation, and listening to others speak.

Not only does a child's language ability develop from hearing others speak and speaking to them (i.e., turn-taking), the child's own speech is a dynamic indicator of cognitive functioning. Research techniques have been developed which involve counting a young child's vocalizations and utterances to estimate a child's cognitive development. However, the current process of collecting this information requires human observers which is obtrusive and influences behavior. It additionally requires transcription of audio recordings which is expensive and time consuming.

Much of what we know about how language develops in children comes from research studies in which parent and child speech were recorded in a natural home environment. Once recorded, the speech was manually transcribed to create text files. From these text files, various metrics were derived such as number of phonemes, morphemes, utterances, words, nouns, verbs, modifiers, declarations, interrogatives, imperatives, affirmatives, prohibitions, sentences and phrases. These and other metrics or combinations and transformations thereof of parent speech were then related to measures of the child's language ability, vocabulary size, IQ, literacy and other academic skills to show their causative relationship. An example of such a research study is described in Hart and Risley, "Meaningful Differences in the Everyday Experiences of Young American Children"1995.

The type of study such as undertaken by Hart and Risley is difficult and expensive to perform because the process of first recording, then converting speech to text and coding text using human observers and transcribers is very laborious. A need exists for systems and methods that reduce the time and cost of this type of data gathering and analysis. By reducing these costs, it becomes possible to perform studies more easily and with vastly larger data sets. More importantly, there is also a need for systems and methods that feed back the speech environment information and estimates of a child's linguistic and cognitive functioning to speakers in homes, day care centers, classrooms, businesses, and other contexts to enable users to enhance learning and development in children, students, and potentially adult learners who may be deficient in language development or are learning a second language.

Even in the classroom, an educator may be teaching one subject while indirectly undermining another subject. For example, an educator may be conscious of using sophisticated vocabulary during language arts courses, but revert to more rudimentary vocabulary during mathematics, fine art, physical education, or other courses where vocabulary is not of primary concern to the curriculum goals. At best, these situations fail to take advantage of an available learning opportunity by integrating vocabulary education with other topics. At worst, these situations may actually undermine the language arts learning that was presented directly in other courses.

Conventional vocabulary education often involves presenting words (verbally and/or textually) to a student along with an image, sound, or other stimulus that represents the meaning of the particular word being taught. The presentation may occur in books, by a teacher, using software, or other means. While potentially effective in the short term, these types of activities do not occur in "real world" contexts, and so this type of education is rarely repeated or reinforced outside of the classroom.

A variety of games have been developed for home and classroom use that attempt to embed the process of pairing the presentation of words and meaningful images in the context of a game. These efforts have some positive effect because they make vocabulary education more engaging, and they encourage vocabulary usage outside of the classroom environment. However, these game-type approaches generally create an artificial context for vocabulary training, and so do not take advantage of the large amount of language learning that can occur in the context of day-to-day activities.

Accordingly, there remains a need for systems and methods for automatically monitoring vocabulary and language usage in the context of day-to-day activities, developing metrics indicating characteristics of contextual language usage, and reporting those metrics to speakers so that they may alter their speech and verbal interactions in a manner that supports vocabulary and language improvement and thus influences IQ and academic success.

SUMMARY OF THE INVENTION

Briefly stated, the present invention involves a computerized speech monitoring system that records speech (e.g., words, vocalizations, vegetative sounds, fixed signals, utterances, dialogue, monologue,) within the listening environment of a learner, from various sources including the learner's own speech and calculates various metrics concerning quantity, level and quality of such speech. The system feeds back this information. The present invention is particularly useful to provide feedback to adults in a child's language environment to enable the adults to adjust their speech to be more supportive of vocabulary and language development of the children. It is expected that the present invention will result in more rapid vocabulary and language development and higher cognitive functioning for children by supporting vocabulary and language development in non-classroom contexts such as childcare centers, preschools, and homes as well as through the early detection of impaired speech and language development.

In a particular embodiment, children and/or adults wear a speech-capture device such as a digital recorder that stores analog/digital sound signals for subsequent computer processing. The sound signals may comprise human-made sounds from one or more people as well as environmental sounds including machine made sounds, television, radio, and any of a variety of sound sources that affect the language learning environment. Captured sound signals are stored then communicated to a sound-processing computer. Alternatively, the sound processing computer can be integrated with the sound capture device itself. The sound signals are analyzed to develop metrics describing various characteristics of the language learning environment. When the sound signal includes human-made sounds (e.g., child speech) the analysis may develop metrics that quantify phonemes, morphemes, utterances, words, nouns, verbs, modifiers, declarations, interrogatives, imperatives, affirmatives, prohibitions, sentences and/or phrases occurring in the human-made sounds. In some applications persons in the natural contextual environment of the learner, such as a parent, may input codes or identify words occurring in the human-made sounds to enhance the functioning of the analysis and reporting features of the present invention.

The present invention involves a method of supporting vocabulary and language learning by positioning at least one microphone so as to capture sounds, including human-made sounds, in the listening environment of a learner or learners. The microphone can be placed in clothing worn by the learner or learners at a substantially fixed position relative to the learner's mouth and/or ears. The captured sounds are analyzed to determine at least one characteristic of the captured sound. The determined characteristic may be compared to a predefined standard. Alternatively or in addition the determined characteristic may be tracked over time to show change over time.

DETAILED DESCRIPTION OF THE PREFERRED EMBODIMENTS

Figure 1A:
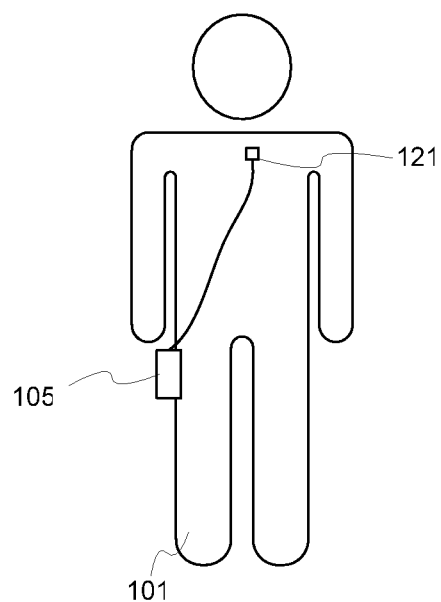
FIG. 1a illustrates a particular implementation of the present invention.

The present invention is illustrated and described in terms of an educational support system specifically adapted to support vocabulary and language improvement in children by enabling parents, teachers, and other adults who work with the children to be more aware of the listening environment around the children. Another purpose is to provide a means to easily measure the level of a child's language, vocabulary, and cognitive functioning in a naturalistic setting. It is contemplated that the present invention may be adapted to support learning of various subject matter including mathematics, science, social sciences, and other language arts skills. Various fields of endeavor often have a domain-specific vocabulary or "academic vocabulary" that is unique to that field of endeavor. Learning that vocabulary is often a precursor to success in that field. The techniques of the present invention are adapted to monitor, analyze and report on vocabulary usage (e.g., words used and frequency with which particular words are used) and so directly support both language and general vocabulary learning as well as domain-specific vocabulary learning.

Moreover, the techniques of the present invention can readily be adapted to monitor, analyze and report on not only vocabulary usage, but also on more complex concepts as those concepts are represented in spoken words, phrases, sentences and other passages of various lengths and complexity including the detection and reporting of specific books, articles, poems, songs as well as passages and portions of these complex materials when they are read to or spoken by and/or to a child. Further, the present invention can be adapted to monitor one-way communication such as monologues and lectures or from the TV and radio as well as two-way or multi-way communication common in conversations.

In specific embodiments the system and method of the present invention is used in non-classroom environments to support language and vocabulary usage in situations and contexts where adults may be less aware of their vocabulary usage and language interactions such as at home, work, commuting, on the telephone, and similar situations. However, the present invention is useful in classroom settings as well to support continuous monitoring of educators, students and classroom guests and helps them improve their own language ability and achieve vocabulary goals.

To ease description and understanding, the present invention is described in terms of systems that monitor speech in the listening environment of a learner or learners. The learner could be a child, student, or adult. It should be understood that the present invention is readily adapted to work with acoustic communication and speech that do not use words in the conventional sense. Particularly in the case of young children or persons with disabilities, the communication may comprise primitive vocalizations, babble or other precursors to speech. While such utterances may not be readily understood, these types of communication are important stepping-stones to learning to speak and developing a more mature, functional vocabulary. Moreover, while monitoring interactive communication is part of the present invention, it is contemplated that the present invention may be usefully implemented to monitor and analyze non-interactive communication and speech, including pre-linguistic vocalizations and vegetative sounds, as well. Accordingly, the specification and claims are intended to cover a wide range of speech and communication and non-communicative sounds unless specifically indicated to the contrary.

Figure 1B:
FIG. 1b illustrates another implementation of the present invention.

FIG. 1a and FIG. 1b show implementations of the present invention in which a user 101 is outfitted with a portable or wearable sound capture device 105. The implementation of FIG. 1a may be more convenient for adults and older children in that a wired or wireless microphone 121 that is separated from the sound capture device may be more comfortable. The implementation of FIG. 1b may be more suitable for infants and toddlers because the capture device 105 includes an integrated microphone and may be positioned within garments worn by the user 101 as suggested by the dashed-outline pocket or pouch holding the capture device 105 in FIG. 1b.

It is desirable to position a microphone in a location that is substantially fixed with respect to the mouth and/or ears of user 101. It is expected that the relative position may change by several inches during use in practical applications while still providing suitable performance. This position is believed to improve sound capture and to better distinguish sounds uttered by the user 101 from background noise or sounds from other speakers. Suitable results may be achieved even when the microphone is not substantially fixed, however, this may require more complex sound signal processing to compensate for the motion. Other configurations that accomplish this goal may be appropriate for particular applications.

Figure 3:
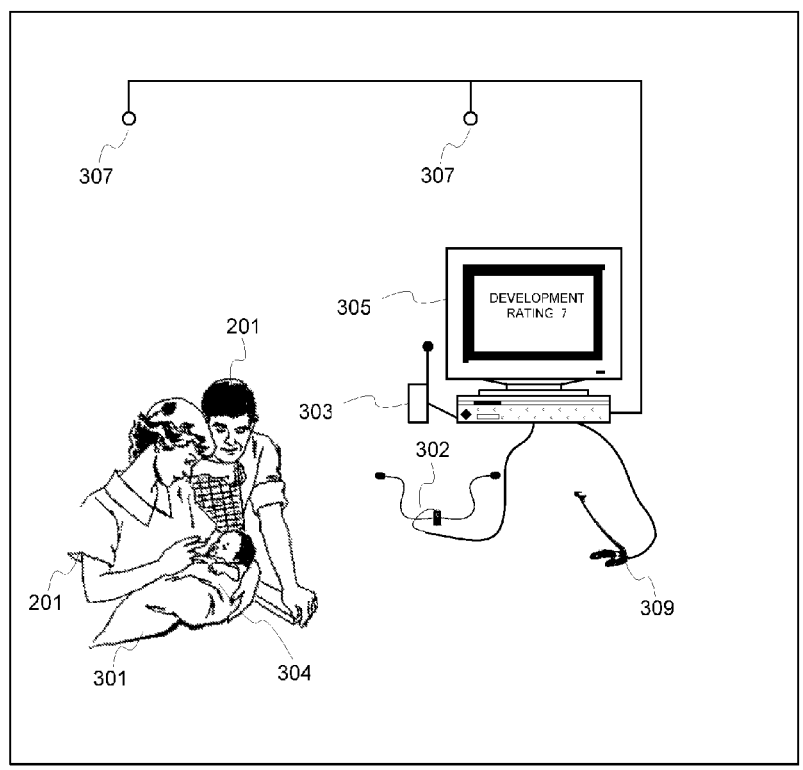
FIG. 3 shows an environment in which the present invention is implemented.

Microphone 121 may be a single element microphone as shown in FIG. 1a, or a multi-element microphone system (examples of which are shown in FIG. 3). Multi-element microphones enable improved directionality and so are useful in speaker identification tasks. Specific placement of microphone 121 can be adjusted to meet the needs of a particular user and environment.

Sound capture device 105 is preferably implemented with integral analog or digital recording mechanisms such as random access memory, disk storage and the like so that speech may be captured over a period of time and loaded into a data processing device for analysis and reporting. Alternatively, sound capture device 105 may be implemented as a simple microphone that couples analog sound signals to external storage or to an external data processing system for analysis and reporting.

Figure 2:
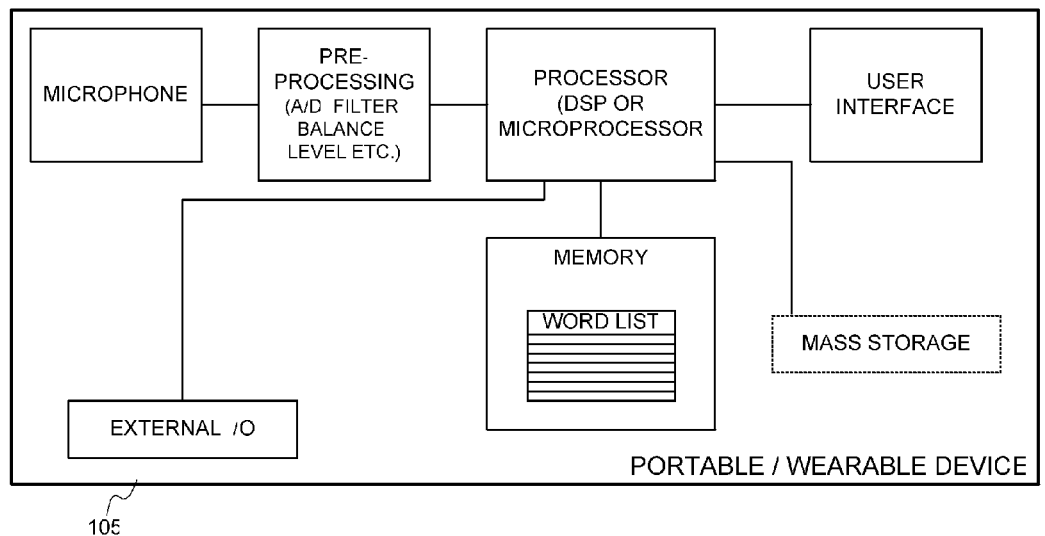
FIG. 2 illustrates a self-contained or wearable implementation of the present invention.

FIG. 2 illustrates in block diagram form an exemplary implementation of a self-contained or wearable portable sound capture device 105 in accordance with the present invention. Continuing advances in computing power and memory density make it feasible to perform relatively complex speech analysis in computing systems that are small enough to be portable or even wearable. Moreover, certain implementations of the present invention contemplate the use of imprecise speech recognition functions, which can be far less computationally intensive than precise speech recognition and speech-to-text applications.

In the implementation shown in FIG. 2, an integrated or plug-in microphone is coupled to an optional pre-processing component that can provide a variety of functions such as A/D conversion, digital/analog filtering, compression, automatic gain control, balance, noise reduction, and the like. The pre-processed signal is coupled to a processor component that works cooperatively with memory to execute programmed instructions. Optionally, mass storage may be provided in the device itself as has become available in media player devices such as the iPod produced by Apple Computer, Inc. Alternatively, mass storage may be omitted, which would prohibit the use of logging or subsequent analysis, or mass storage may be implemented remotely via devices coupled to the external input/output. The user interface may be implemented as a graphical, text only, or hardware display depending on the level of information required by a user.

In typical operation, acoustic signals are detected by the microphone, pre-processed if necessary or desired, and provided as input to the processing component. In one embodiment, the processor component functions to store pre-processed speech signals in memory and/or mass storage for subsequent, asynchronous analysis. In another application, a predefined word list (or phrase list) is loaded into memory where each word is represented by text or, more commonly, each word is represented as a digital code that more readily matched to the pre-processed speech signal that is presented to the processor component. Processes executing on the processor component operate to match portions of the monitored speech signal with the word list and maintain a count of how frequently each word on the word list occurs.

FIG. 3 shows an environment in which a specific example of the present invention is implemented. In this example an adult 201, such as a parent, teacher, daycare supervisor, nanny, employer, or other adult. Adult 201 engages in interactive communication with child 301. The communication may include direct discussion of vocabulary, but more frequently involves everyday discussions about other topics, sports, news, household and world events, and the like. An important goal of the present invention is to enable adults 101 to be more aware of language and vocabulary usage in the context of these everyday communications.

The present invention involves a combination of at least one sound capture device 105 to capture speech, and a computer or data processor for performing analysis and reporting functions. In FIG. 3, adult 201 and/or child 301 are provided with a wearable, wireless microphone system 304. A wearable microphone system 304 has some advantages in that it can ease the process of speaker identification (i.e., discriminating between multiple speakers in an environment) as well as discriminating between human-made sounds and other sounds in a real-world environment, which can ease the later analysis processes. In other implementations a wearable or non-wearable microphone comprising a "gooseneck" microphone 302 having two microphone elements positioned at either ends of a flexible, semi-rigid stalk which may be bent or molded to the user's desires or a single stalk microphone 309 may be suitable. In another example, sound capture device 304 is implemented as a harness or vest which includes one or more microphones affixed to the harness such that microphone placement is more precise. Such devices are relatively inexpensive and would not require any special modification to operate with the present invention. Wearable sound capture device 304 may include self-contained recording/data storage apparatus. Sound capture device 304 may be coupled to computing system on demand via a cable connection or cradle (not shown). Alternatively, wireless communication or networking technology can be employed to couple sound capture device 304 wireless interface 303 to computer 305.

Alternatively or in addition, the room in which the communication occurs can be outfitted with one or more microphones 307 that are coupled to computer system 305 via wired (e.g., universal serial bus or sound card connection) or wireless connections. Microphones 307 are less intrusive to the participants, but may compromise the ability to discriminate particular speakers and may be more subject to background noise. On the other hand, distributed microphones can be used to track movements of the speakers and provide information about non-verbal conditions in the learning environment during the communication (e.g., distance between adult 201 and child 301).

Computer system 305 may be implemented as a personal computer, laptop computer, workstation, handheld computer or special-purpose appliance specifically designed to implement the present invention. Although not illustrated in FIG. 3, it is contemplated that some or all of the speech analysis functionality may be implemented in a wearable computer and/or integrated with speech capture device 304, or provided in a device such as a dictation machine, cell phone, voice recorder, MP3 recorder/player, iPod by Apple Computers Inc., or similar device.

In operation, adult (101) and child (301) speech is captured for analysis by computer 305, which computes and displays metrics that quantify certain characteristics of the communication. Examples of metrics that may be produced in this manner include counting the number of words spoken, counting the frequency at which words are spoken, estimating word length, estimating sentence complexity, and the like. It is believed that some of these metrics, such as sentence complexity and word length, can be estimated using imprecise techniques that count syllables or measure utterance duration, count phonemes, look for changes in cadence, volume, or other clues in the speech signal that indicate complexity without actually attempting to decipher the particular word that is spoken. U.S. Pat. No. 6,073,095 describes an exemplary imprecise recognition technique for spotting words in speech that includes techniques that may be useful in the practice of the present invention.

Optionally, the analysis performs an estimate of the emotional content or feedback "tone" of the communication being monitored. It is believed by many researchers that positively intoned speech (e.g., "good job") and negatively intoned speech (e.g., "bad boy") impact the learning rate for various topics, including vocabulary and the amount of interactive speech or turn-taking where an adult or child speaks and the other responds. Similarly, the number of questions asked of a child in contrast with directives given to a child may affect the rate of learning. Both precise and imprecise language analysis techniques can be used to develop a metric related to the emotional content, or the question/directive content of communications, turn-taking, or other content features of speech that are determined to be relevant to a supportive learning environment.

Although the present invention as described hereinbefore is a useful tool for monitoring and analyzing speech as might be done by researchers, it is also contemplated that the invention can be used to automatically provide feedback to speakers in a learner's listening environment about characteristics of their own speech. Computer system 305 computes and displays metrics that quantify or qualify the monitored characteristics of the speech. Alternatively or in addition the metrics are logged in a data storage mechanism within computer 305 or coupled to computer 305. The manner and variety of metrics that are displayed/logged are a matter of design choice to suit the needs of a particular application.

Figure 4:
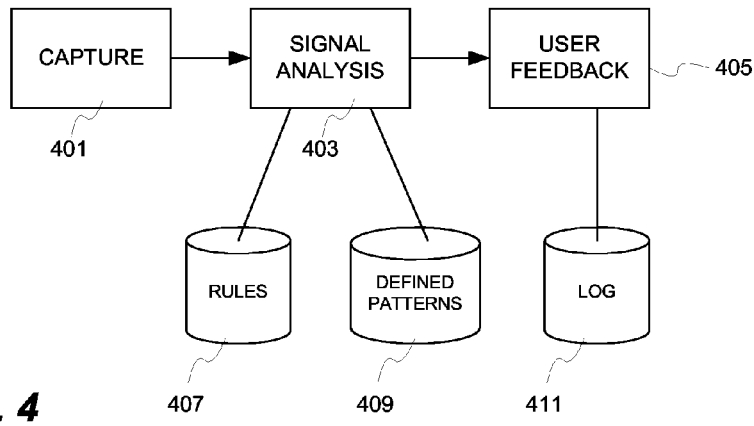
FIG. 4 illustrates, in block diagram form, components of a software product in which the present invention is implemented.

FIG. 4 illustrates, in block diagram form, components of a software product in which the present invention is implemented. The logical operations of the components herein described may be implemented (1) as a sequence of microprocessor implemented acts or program modules running on a microprocessor and/or (2) as interconnected machine logic circuits or circuit modules within a computing device. The implementation is a matter of choice dependent on the performance requirements of the particular application. Accordingly, the logical operations described herein may be referred to variously as operations, routines, structural devices, acts, or modules. While the following embodiments are discussed as being implemented as software, it will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Capture component 401 receives a sound signal from a microphone, which may have been preprocessed by the microphone or associated processing circuitry, in analog or digital form. Capture component 401 may be implemented as a stream object, for example, the Java programming environment, or an equivalent in other programming environments. Optionally, capture component may perform functions such as analog to digital conversion, compressing, filtering, normalizing, amplifying, and the like to provide a sound signal suitable for analysis by signal analysis component 403.

Signal analysis component performs any of a variety of functions that quantify characteristics of captured sound, including human-made sounds and other sounds in the learning environment. For example, signal analysis component 403 detects features in the sound signal such as word/utterance boundaries, elapsed time between word/utterance boundaries, sentence boundaries, language (English, French, Japanese, etc.), sentence boundaries, changes in volume or inflection, and the like. The features may be detected by application of rules 407 (e.g., a silence for 0.5 microseconds indicates a word/utterance boundary) or by comparison of the speech signal to defined patterns 409. The use of defined patterns can be user independent or user dependent, and can be used to, for example, predefine a set of vocabulary words that are to be counted.

Optionally, the signal analysis component may perform speech recognition and/or speaker recognition to convert sounds to words and identify which speaker is associated with particular spoken words. Similarly, signal analysis may involve the conversion of sounds to phonemes, estimates of the spoken word, word roots, and the like. The signal analysis may recognize longer, multi-word passages and dissertations in addition to or instead of individual words and word parts.

Signal analysis component 403 uses these detected features to determine metrics such as word count, word length, language complexity, sentence length, and the like. Metrics are provided to user feedback component 405 that presents selected information to the users 101/201/301 using a graphic display, text display audio display, signal lights, or other interface mechanism. Optionally, metrics can be logged for later analysis and later presentation to a user.

Figure 5:
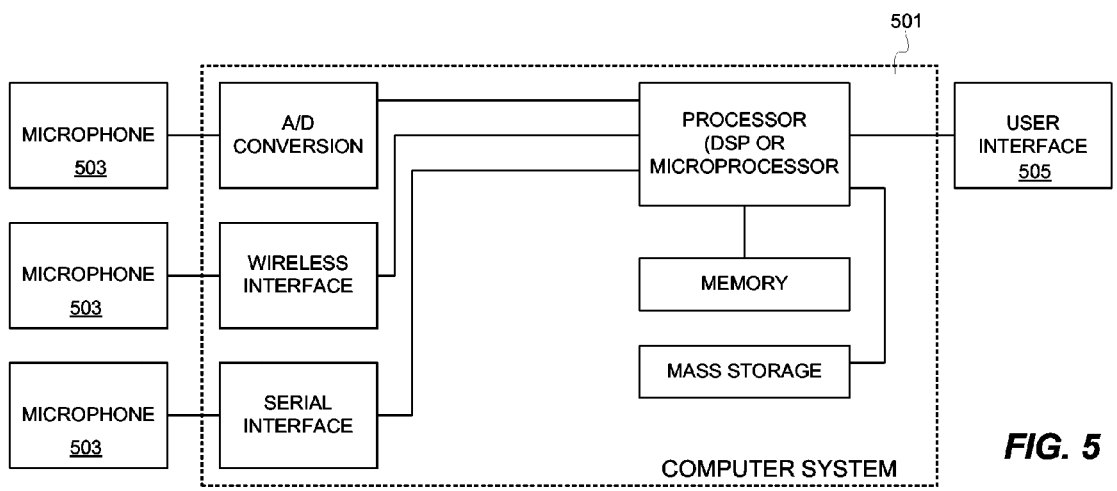
FIG. 5 shows an exemplary computer system implementation of the present invention.

FIG. 5 shows a first exemplary computer system implementation of the present invention in which a stand-alone general-purpose computer system 501 is used to implement the processes and methods of the present invention. General-purpose computer system 501 includes a processor and memory coupled to the processor. The processor comprises a microprocessor, microcontroller, digital signal processor, or the like. The processor and memory work cooperatively to execute programmed instructions, which may be stored in the memory or in attached mass storage.

Microphones 503 may couple to computer system 501 through an analog to digital conversion circuit often implemented in a sound card of a personal computer. Alternatively or in addition, microphone 503 may couple via a wireless interface (e.g., radio frequency or infrared interface), or through as serial interface (e.g., RS-232, universal serial bus or "USB" IEEE-1394 or "firewire" or the like). One advantage of using a general-purpose computer system as shown in FIG. 3 is that operating system software is readily available, the cost for a given amount of processing power is reasonably low, and a large number of suitable computer systems are already deployed and could be configured to implement the present invention by providing appropriate software. Further, peripheral components such as microphones 503 and user interface 505 are readily available. The user interface may be implemented as a graphical, text only, or hardware display depending on the level of information required by a user.

In typical operation, acoustic signals are detected by the microphone(s), pre-processed if necessary or desired, and provided as input to the processor. In one embodiment a predefined word list (or phrase list) is loaded into memory and processes executing on the processor component operate to match portions of the monitored speech signal with the word list and maintain a count of how frequently each word on the word list occurs. Processes executing on the processor may be used to perform speech recognition, speaker recognition, and to compute any other desired metric.

Figure 6:
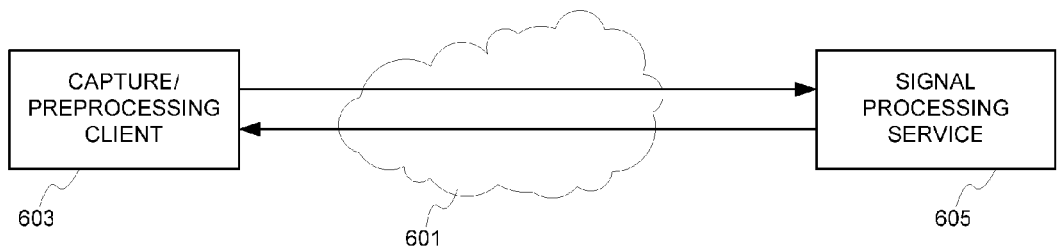
FIG. 6 illustrates a distributed architecture for implementing features of the present invention.

FIG. 6 illustrates a distributed architecture for implementing features of the present invention. In the implementation of FIG. 6, client processes involving capturing speech and presenting feedback to the user are provided by a client component 603 while signal processing and analysis is provided by a network-coupled service 605. Resources used to implement service 605 may be shared across a plurality of clients 601. Clients 603 may be implemented with comparatively low cost, lightweight components as the computationally intensive processes are offloaded to the signal processing service 602. Network 601 may comprise a local area network (LAN), wide area network (WAN), public network such as the Internet, or other network implementations.

Applications

The present invention describes fundamental systems, methods and processes that can be applied to a variety of applications including research tools, educational tools, and to commercial applications for use in homes and businesses. Although a number of these applications are specifically disclosed herein, it should be understood that the present invention is readily adapted to a wide variety of applications in which benefit from monitoring, analyzing and reporting sounds in a natural language environment.

Linguistic

Linguistic applications refer to a broad class of applications that are directed to improving speech skills such as vocabulary by monitoring speech, analyzing the speech, and providing some form of feedback such that speakers can improve the speech learning environment. A computerized speech monitoring system records speech (e.g., words, utterances, dialogue, monologue and the like) within the listening environment of a learner, from various sources including the learner's own speech. Various metrics concerning quantity, level and quality of the speech are computed. The system feeds back this information in the form of reports or other indication so that the participants can at least be aware of the language environment, and more preferably can alter their behavior to improve the language environment.

The present invention is particularly useful to provide feedback to adults in a child's language learning environment to enable the adults to adjust their speech (as well as other factors affecting the language learning environment) to be more supportive of vocabulary and language development of the children. It is expected that the present invention will result in enhanced vocabulary and language development and higher cognitive functioning for children by supporting vocabulary and language development in non-classroom contexts such as childcare centers, preschools, homes and the like.

In a particular embodiment, adults and/or children wear a sound capture device 304 that communicates analog/digital sound signals with an external processing computer. Alternatively, the speech processing is performed in can be integrated with the sound capture device itself. In a linguistic application human-made sounds, particularly speech related sounds, are of importance, however, other environmental sounds may be important as well. Speech recognition software is useful to translate speech to words. In some applications the speech recognition can be imprecise in that metrics describing various characteristics of the speech-related components of the sound signal such as word length, word count, sentence length, speaker identity, and the like may be developed without need to actually recognize the words that are being uttered. In some applications persons in the natural contextual environment of the learner, such as a parent, may input codes or identify words to enhance the functioning of the analysis, speech recognition systems and reporting features of the present invention.

Pre-Linguistic

Pre-linguistic applications refer to a class of applications that are directed to developing and improving speech skills before a learner has developed linguistic speech skills, or while a learner is acquiring linguistic speech skills. Because the present invention is not limited to processing only linguistic sounds, it can be readily adapted to monitor, analyze and report with respect to pre-linguistic utterances including vegetative sounds, cooing, babbling and the like. These sounds may be precursors to linguistic skills in infants and young children, or may be a permanent or semi-permanent level of communication for impaired individuals.

A pre-linguistic speech monitoring system in accordance with the present invention records sounds (e.g., vocalizations, vegetative sounds, utterances, dialogue, monologue, and the like) within the listening environment of a learner, from various sources including the learner's own sounds. Various metrics concerning quantity, level and quality of the sounds may be computed. The system feeds back this information to other speakers, parents, teachers and the like. The present invention will result in more rapid language acquisition and higher cognitive functioning for children by supporting natural language environments as well as through the early detection of impaired speech and language development.

Complex Material Monitoring

In addition to applications that involve language acquisition and skill development, the present invention is useful in content-aware applications. Complex material monitoring applications involve detecting the occurrence of strings of words, phrases, books, portions of books, poems, songs, and the like that are indicative of content being received by a learner. Occurrence of a complex passage in a sound stream can be identified by, for example, recognizing the words and comparing those words to known text. Although the system in accordance with the present invention can be configured to identify complex passages in their entirety by comparing the recognized speech with a text file or the like representing a passage being read, in many cases it will only be necessary to recognize selected passages or paragraphs within a complex work. Analysis processes may provide metrics indicating how often a passage is spoken, the speed with which it is spoken, how the speed varies over time, and the like. Difficult portions of a spoken passage can be identified and called out to the speaker or a parent, coach, teacher and/or the like to provide feedback as to the speaker's performance.

Alternatively, spoken words and/or sounds of varying length can be processed and filtered to derive a signature that represents occurrence of those words in a sound stream. Hence, it is not necessary to for the system to actually recognize words and compare that to known text, merely to recognize when a signature corresponding to the passage occurs in the sound signal being monitored. Depending on the type of processing and filtering, and the sounds themselves, the signature may be more or less speaker independent.

Conversation and Interaction

In many circumstances it is desirable to know information about the progress of conversations and the interaction between multiple speakers. For example, some students learn more from interactive teaching in which they are asked questions and encouraged to form an answer whereas other students learn best by a lecture-style approach to providing information. Similarly, infant speech development is impacted by the frequency and manner in which a parent or other adult speaks to the infant and listens to the response (linguistic or pre-linguistic). This back and forth of the flow of communication is referred to as "turn-taking".

Figure 7:
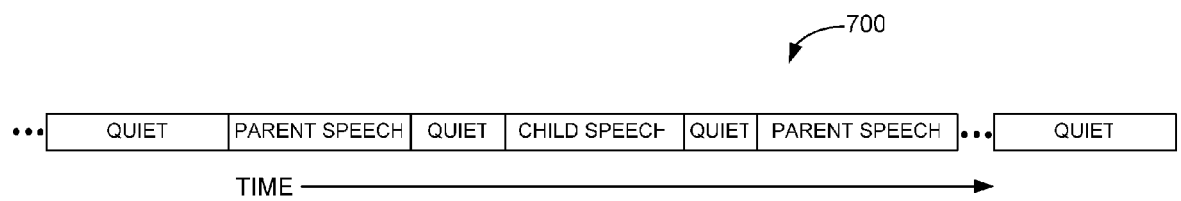
FIG. 7 illustrates a monitored interaction between a child and a parent.

In FIG. 7 an interaction between a child and a parent is monitored. In this example it may only be necessary to monitor who is speaking and measure the length of each speaking segment and the quiet time between utterances. The system in accordance with the present invention can develop metrics indicating the frequency and duration of the turn-taking, as well as indicating the cadence or other characteristics that help speakers, parents, educators, researchers, or other interested parties understand and improve the language environment. More detailed analysis can identify information in the sound signal that indicate tone, repetition of words, distinguish vegetative sounds from linguistic and pre-linguistic sounds, monitor the frequency and duration of distracting background sounds, and the like.

Research

The present invention exhibits several characteristics that make it a significant improvement over techniques conventionally used for speech research. Conventionally, speech research involves observers who attempt to passively observe activities that are being studied. However, the observer's presence will almost always impact the activities being observed and therefore affect the accuracy and value of the observations. The present invention enables participants in the language environment being monitored to replace observers thereby lessening or eliminating the influence and expense of human observers in the research environment.

Another feature of the present invention is that by operating in a natural language environment, as opposed to a clinical, classroom, or other special-purpose environment, the quantity and variety of data that can be gathered is significantly greater than possible with other research techniques. Whereas a conventional researcher might be limited to an hour or so of monitoring a subject in a computer laboratory, the present invention allows the subject to be monitored throughout the day and over many days. Moreover, the subject is not monitored alone, but in context of the various other people with which the subject normally interacts. The subject can be monitored in conversations with a variety of people, in a variety of backgrounds, on telephone calls, and the like. This quantity and quality of data is difficult to obtain using conventional techniques.

Computer Assisted Coding

In another application a person in the language environment of the learner, such as a parent, may listen to audio files of the learner's speech collected in accordance with the present invention and input codes to better identify such sounds or link the sounds to words and/or phrases. The term "coding" refers to process for annotating sounds, which may or may not be readily recognizable as speech, with information indicating an observer's interpretation or understanding of the sound. Various automated and observer-based coding systems have been devised, however, the present invention enables a natural participant in language environment (in contrast with an observer), to perform the coding. In this manner the present invention provides computer-assisted coding rather than either observer based or automated coding. By enabling person in the language environment to perform this interpretation and coding the impact that an observer might have is avoided, and improved accuracy may result from having someone familiar with the learner perform the coding. This information can be used to enhance the processing and reporting of speech metrics.

Speech Recognition, Voice-Enabled Software Applications

Although the present invention does not require or rely on speech recognition directly, it provides several functions that can augment conventional speech recognition and voice-enabled software applications. Speech applications generally involve algorithmic processes for matching portions of a sound signal with a previously trained sample. One recurring difficulty in speech recognition involves training the systems so that the algorithms can successfully translate a sound signal into words. In a typical application a user is asked to read a script containing a set of words or a passage of text and the sound made by the reader is analyzed and correlated with the known text. This technique cannot be used when the person cannot read, or reads in a manner that is difficult to understand due to non-standard pronunciation and the like. This makes it difficult to train speech software to work with infants, children, developmentally disabled persons, people with injuries that affect speaking such as stroke and accident victims and the like, as well as normally functioning adults with particular accents.

The present invention enables unscripted speech that occurs in a natural language environment to be used for such training. Once sounds are recorded the speaker or an assistant can code the recorded sounds to correlate the speech to particular speakers, words or complex concepts. This enables sounds that are pre-linguistic to be correlated to meaningful words by someone familiar with the speaker, even when that person is not a speech or linguistic expert. In turn, this encoding can be used to augment or replace the learning file used by speech recognition and voice enabled applications. Moreover, as a person progresses with language development or overcomes a language impediment, the analysis and reporting features of the present invention allow the speaker, assistants, or software to become aware of the changes so that the coding can be updated to reflect the new characteristics of the speaker. In this manner the present invention enables a system for continuously and dynamically improving training of a variety of software applications.

Foreign Language Applications

Many of the methods and systems described hereinbefore for supporting language acquisition are directly applicable to learning a second or "foreign" language. The present invention can be used to support formal language training in a classroom, self-study or software assisted study environment by monitoring vocabulary usage, pronunciation, study pace and the like as well as monitoring the recitation of complex material such as articles, books, poetry, songs and the like. These tasks are largely akin to baseline language support applications described as pre-linguistic applications and linguistic applications.

In addition, the present invention can be used to monitor, analyze and report multi-lingual speech in a natural language environment such as a home or office. The systems and methods of the present invention can be adapted to monitor and report on the frequency of usage of certain words and terms in particular languages at home, or monitor and report on the relative percentage of occurrence of a first language as compared to a second or third language in a multi-lingual home. This information can be fed back to parents, educators, or other interested parties so that the mix of language use can be balanced to support various foreign language goals. For example, a child learning English in a home where English is a second language may benefit from increased usage of English at home. Alternatively, a child that is attempting to learn multiple languages may benefit by increasing the use of non-primary languages while performing day to day tasks. The present invention enables the use of languages to be monitored, analyzed and reported in an efficient and effective way.

Assessment Tool Applications.

A number of non-speech disorders may express themselves symptomatically by affecting speech characteristics. The speech characteristics may be an early indicator for an underlying non-speech disorder. One aspect of the present invention is the creation of mappings between various non-speech disorders and detectable speech characteristics. The sound capture, analysis and reporting tools described herein can be used to detect the expressed speech symptoms and thereby provide a new way to detect and assess the progress of the underlying non-speech disorder. As we discussed, this system is expected to be especially useful for chronic, difficult to detect conditions such as autism, Alzheimer's disease, and the like. The system is also useful for non-disease conditions such as might be caused by chronic exposure to environmental toxins or injury/trauma. It is also possible to use this system to detect and assess more acute conditions such as blood chemistry variations, toxic exposure, and the like.

Normative Charts.

There is a need for the development of a normative chart, akin to a height and weight chart, that represents normal ranges of language development, including pre-linguistic development. The present invention enables the development of normative charts that involve multiple dimensions and combinations of dimensions and so will not always be represented as two-dimensional graph like the familiar height and weight chart.

The normative charts may be useful in the detection, diagnosis and treatment of various condions. For example, one may compare measured characteristics obtained from monitoring the sounds from a particular patient with the normative charts to detect that a particular condition may exist. Subsequently, that condition may be treated by appropriate medical techniques for the indicated condition.

Pattern Analysis.

The present invention also contemplates the use of computers and automation to perform a more granular, sensitive and accurate analysis of sound patterns than has been performed in the past. Conventional analysis techniques operate at the granularity of words, phonemes, and the like which have generally developed from the study of normally-developed individuals speaking a particular language. These techniques are often not sufficient to study and understand sounds made by persons that are not normally developed individuals speaking that particular language. For example, pre-linguistic infants and children, injured persons, handicapped persons, impaired persons, and the like do not always produce sounds that can be handled at the granularity of a conventional model. The present invention enables a more granular and accurate analysis of sounds made by a person.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the present invention can be deployed to support a variety of applications that involve monitoring spoken activity such as on-the job training by monitoring and reporting usage of directly trained subject matter in on-the-job contexts subsequent to direct training, monitoring content delivered on radio, television, Internet, or other audio channels to determine whether the content does or does not contain certain words, phrases or other statements (e.g., automatically verify that a particular advertisement played and was repeated for a predetermined number of times to comply with contractual obligations).

What is claimed is:

1. A method of supporting language development comprising:
    capturing sound in a natural language environment, using at least one sound capture device which is located in the natural language environment;
    developing a sound signal from the captured sound, wherein the sound signal comprises components representing one or more features that affect a language development environment;
    analyzing the sound signal to determine at least one characteristic of the language development environment, wherein at least one characteristic indicates a qualitative or quantitative assessment of the one or more features, wherein the at least one characteristic is a frequency and duration of conversational turn-taking;
    comparing the determined characteristic to a preselected standard or change over time; and
    reporting results.

2. The method of claim 1 wherein the sound captured includes human made sound, wherein the human made sound may include a number of utterances, and wherein the utterances include cooing, babbling, prelinguistic sounds and linguistic sounds.

3. The method of claim 1 wherein the speech involves at least two participants and the method further comprises associating the sound signal with a particular one of the at least two participants.

4. The method of claim 1 further comprising positioning at least one sound recording device in a substantially fixed location relative to a person.

5. The method of claim 4 wherein the act of positioning at least one sound recording device comprises placing the sound recording device within an article of clothing of the person.

6. The method of claim 1 wherein the act of analyzing comprises counting a quantity of utterances spoken.

7. The method of claim 1 wherein the act of analyzing comprises determining the frequency with which particular utterances occur in the sound signal.

8. The method of claim 1 wherein the act of analyzing comprises determining a length of utterances that occur in the sound signal.

9. The method of claim 1 wherein the act of analyzing comprises estimating the emotional tone of the utterances that occur in the sound signal.

10. The method of claim 1 wherein the act of analyzing uses imprecise speech recognition.

11. A system for supporting language acquisition, the system comprising:
    a sound capture component operable to capture sounds produced by a first person and a plurality of other sound sources, wherein the plurality of other sound sources includes other people;

a sound processor coupled to the sound capture component and operable to analyze a sound signal from the sound capture component and identify characteristics of the captured sounds, including characteristic related to the first person and the plurality of other sources; and a reporting component coupled to the sound processor and operable to report metrics that quantify the identified characteristics, wherein the identified characteristics include a frequency and duration of conversational turn-taking.

12. The system of claim 11 wherein the sound capture component is housed in a garment of the first person.

13. The system of claim 11 wherein the sound capture component and speech processor are integrated as a single device.

14. The system of claim 11 wherein the reporting component reports metrics substantially in real time.

15. The system of claim 11 wherein the reporting component logs metrics for review at a time after the sound is captured.

16. The system of claim 11 wherein the system is adapted to support pre-linguistic language acquisition.

17. The system of claim 11 wherein the sound processor is operable to identify characteristics indicating that the captured sound relates to particular material selected from the group consisting of books, articles, poems, speeches, songs and stories.

18. The system of claim 11 wherein the system is adapted to support language research.

19. The system of claim 11 wherein the system is adapted to assist a parent, teacher or researcher in a process of coding language of a person who is speaking.

20. The system of claim 11 wherein the system is adapted to support foreign language acquisition.

21. The method of claim 1 wherein conversational turn-taking means when a first speaker speaks to a second speaker and the second speaker listens and subsequently responds.

22. The method of claim 1 wherein conversational turn-taking is a back and forth flow of communication.

23. The method of claim 11 wherein conversational turn-taking means when a first speaker speaks to a second speaker and the second speaker listens and subsequently responds.

24. The method of claim 11 wherein conversational turn-taking is a back and forth flow of communication.

25. A method of supporting language development comprising:
capturing sound in a natural language environment, using at least one sound capture device which is located in the natural language environment;
developing a sound signal from the captured sound, wherein the sound signal comprises components representing one or more features that affect a language development environment;
analyzing the sound signal to determine at least one characteristic of the language development environment, wherein at least one characteristic indicates a qualitative or quantitative assessment of the one or more features, wherein the analyzing includes providing a predefined word list, where each word of the predefined word list is represented by digital code that is more readily matched to words in the sound signal;
comparing the determined characteristic to a preselected standard or change over time; and
reporting results.

26. The method of claim 25 wherein the determined characteristic is a count of how frequently words of the predefined word list occur.

27. A method of supporting language development comprising:
capturing sound in a natural language environment, using at least one sound capture device which is located in the natural language environment;
developing a sound signal from the captured sound, wherein the sound signal comprises components representing one or more features that affect a language development environment;
analyzing the sound signal to determine at least one characteristic of the language development environment, wherein at least one characteristic indicates a qualitative or quantitative assessment of the one or more features, wherein the analyzing includes providing a predefined phoneme list, wherein each phoneme of the predefined phoneme list is represented by digital code that is more readily matched to each phoneme in the sound signal;
comparing the determined characteristic to a preselected standard or change over time; and
reporting results.

28. The method of claim 27 wherein the determined characteristic is a count of how frequently phonemes of the predefined phoneme list occur.

* * * * *